United States Patent [19]

Junkert et al.

[11] Patent Number: 4,722,612

[45] Date of Patent: Feb. 2, 1988

[54] INFRARED THERMOMETERS FOR MINIMIZING ERRORS ASSOCIATED WITH AMBIENT TEMPERATURE TRANSIENTS

[75] Inventors: Kenneth G. Junkert, Woodland Hills; Henry P. Voznick, Arcadia, both of Calif.

[73] Assignee: Wahl Instruments, Inc., Culver City, Calif.

[21] Appl. No.: 772,372

[22] Filed: Sep. 4, 1985

[51] Int. Cl.[4] ............................. G01J 5/16; G01J 5/26
[52] U.S. Cl. .................................... 374/124; 136/230; 250/339; 250/515.1; 374/133; 374/208
[58] Field of Search ................ 374/124, 121; 136/225, 136/213; 250/332, 333, 339

[56] References Cited

U.S. PATENT DOCUMENTS

| | | | |
|---|---|---|---|
| 4,301,682 | 11/1981 | Everest | 374/112 |
| 4,343,182 | 8/1982 | Pompei | 374/129 X |
| 4,435,092 | 3/1984 | Iuchi | 356/43 X |
| 4,456,390 | 6/1984 | Junkert et al. | 374/124 X |
| 4,456,919 | 6/1984 | Tomita et al. | 136/225 X |
| 4,472,594 | 9/1984 | Ishida | 374/179 X |
| 4,538,464 | 9/1985 | Wheatley et al. | 136/225 X |
| 4,634,294 | 1/1987 | Christol et al. | 374/124 |

FOREIGN PATENT DOCUMENTS 0942450  11/1963  United Kingdom ............... 136/225

*Primary Examiner*—Daniel M. Yasich
*Attorney, Agent, or Firm*—Freilich, Hornbaker, Rosen & Fernandez

[57] ABSTRACT

A thermopile detector means for a temperature measuring instrument physically and electrically configured to supply an output signal which indicates target temperature substantially independent of the influence of ambient temperature changes. The detector means includes a first thermopile device exposed to radiation from the target and a transducer means, preferably a second thermopile device, shielded from the target and connected in series opposition to the first.

14 Claims, 5 Drawing Figures

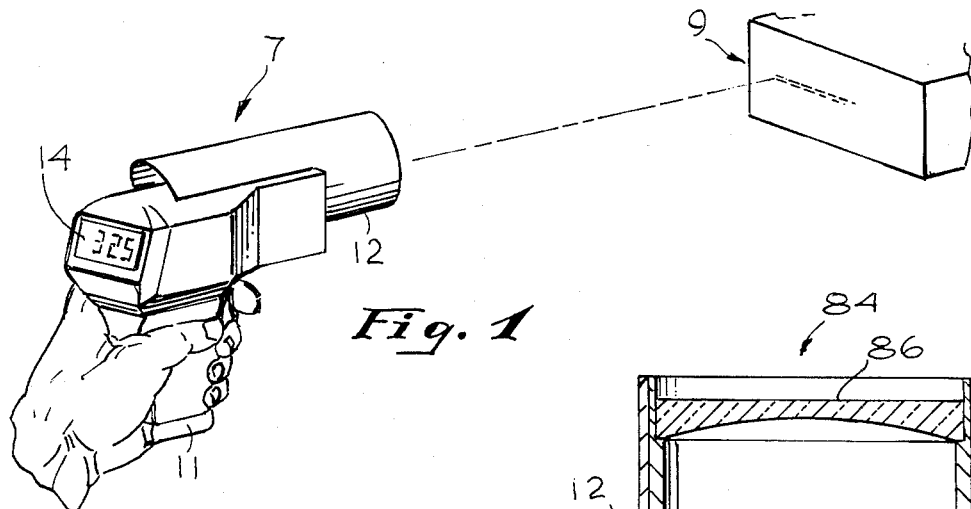
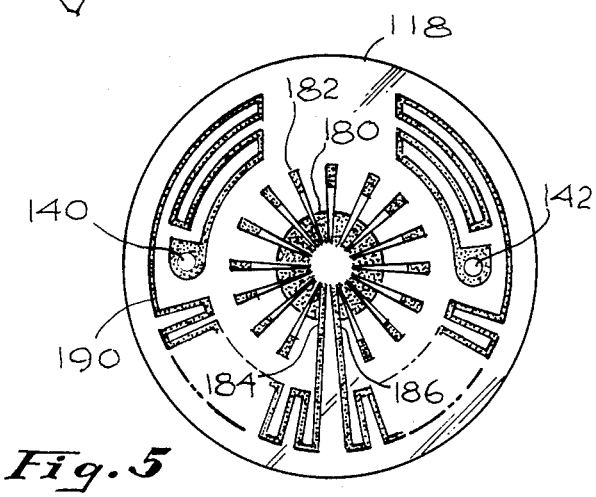
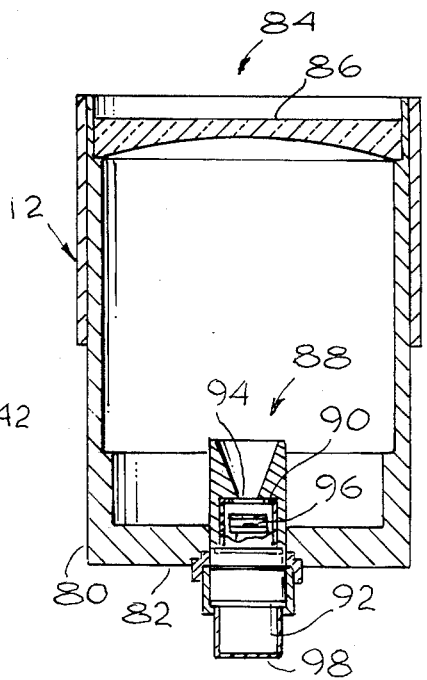
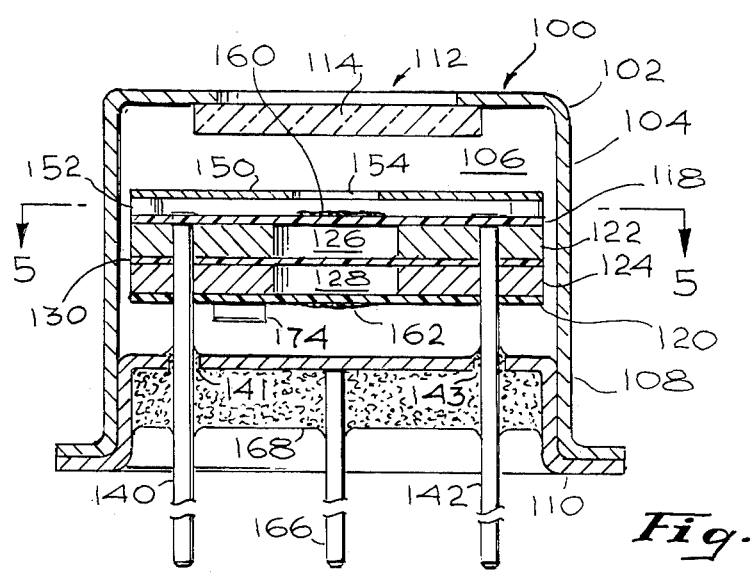

INFRARED THERMOMETERS FOR MINIMIZING ERRORS ASSOCIATED WITH AMBIENT TEMPERATURE TRANSIENTS

BACKGROUND OF THE INVENTION

This invention relates generally to noncontact temperature measuring and more particularly to improvements in infrared thermometers for minimizing errors associated with ambient temperature transients.

U.S. Pat. No. 4,456,390 issued to K.G. Junkert and H.P. Vosnick, and assigned to the assigned of the present application, discloses a portable noncontact temperature measuring instrument incorporating improved temperature compensating and signal processing circuitry. More specifically, the patent discloses an infrared thermometer which utilizes a thermopile detector to develop a temperature indicating output signal for driving a display. The thermometer includes a temperature sensor, (e.g. a diode) thermally coupled to the thermopile to compensate for temperature induced variations in the thermopile responsivity. Additionally, the instrument incorporates circuit improvements including means for compensating for amplifier drift.

Although the aforementioned improvements markedly enhance the instrument's overall performance by minimizing errors attributable to certain sources, nevertheless, errors attributable to rapid ambient temperature transients can still occur. Such errors are particularly troublesome in portable instruments which are typically used in a variety of industrial and energy oriented applications involving relatively harsh environments. More particularly, users typically subject such portable instruments to extreme and rapid ambient temperature changes as would be experienced when moving an instrument from a storage office at 72 degrees F ambient to a location proximate to an industrial furnace where the ambient may exceed 100 degrees F and be characterized by drafts of air flowing over the instrument.

More generally, it is not uncommon for users to subject such portable instruments to ambient temperatures varying from 20 degrees F. to 120 degrees F. and changing at a rate in excess of 1 degree per minute. Such ambient temperature changes typically produce an intrusion of heat into the sensing area or "hot junction" of the thermopile via thermal paths created by external thermopile terminals, housing elements, ambient air currents, etc. As a consequence, the output signal developed by the thermopile can include a component, attributable to the relatively large thermal transients piped into the hot junction via the aforementioned thermal paths, which effectively swamps the signal component attributable to the relatively low level radiation from the target.

Efforts have been made to exclude or compensate for the effect of these transients. For example, it has been suggested that a relatively large heat sink be associated with the thermopile to stabilize it against rapid ambient temperature changes (e.g., see, U.S. Pat. No. 4,301,682). The problem with this approach is that it slows the response time of the instrument and requires relatively long waiting periods to avoid erroneous readings. An alternative approach has relied on periodically interrupting the incoming radiation or temperature indicating signal to re-zero the instrument to null out the influence of ambient temperature. Although these approaches can prove helpful, they are generally insufficient to avoid the overshoot reading errors generally associated with large and rapid ambient temperature changes.

SUMMARY OF THE INVENTION

The present invention is directed to improvement in temperature measuring instruments for minimizing errors primarily associated with rapid ambient temperature changes.

In accordance with one aspect of the invention, an improved detector means is provided which is physically and electrically configured to supply an output signal which indicates target temperature substantially independent of the influence of ambient temperature changes.

The present invention is based on the recognition that a thermopile device supplies an output voltage typically comprised of a first component related to the amount of radiation incident on a sensing area and a second component related to ambient temperature transients. Based on this recognition, an instrument in accordance with the invention utilizes a transducer means, preferably a second thermopile device, which supplies an output voltage similarly related to the ambient temperature transients and is connected in series opposition to the first thermopile device.

In accordance with a preferred embodiment, the detector means is comprised of first and second thermopile elements connected in series opposition. The first and second thermopiles are physically arranged so as to be exposed to the same ambient temperature but only one of the thermopiles is exposed to the target whereas the other is shielded from the target.

In accordance with another aspect of the preferred embodiment, the first and second thermopiles are selected such that the thermopile shielded from the target, i.e. "inactive", supplies a higher amplitude output signal than the thermopile exposed to the target: i.e. "active". A trim resistor, connected in parallel with the inactive thermopile, is selected to null the temperature indicating signal supplied by the two series opposed thermopiles over a broad range of ambient temperatures.

In accordance with a further aspect of the preferred embodiment, the active and inactive thermopiles are mounted in the same housing so as to experience the same ambient temperature. Moreover, an infrared radiation barrier is incorporated in the housing to shield the inactive thermopile from infrared radiation.

In accordance with a still further aspect of the preferred embodiment, the lead-in conductors for each thermopile are physically configured to minimize the intrusion of thermal transients to the thermopile's hot junction. More specifically, in accordance with the preferred embodiment, the thermopile lead-in conductors are formed by relatively thin narrow paths of conductive material laid down in serpentine fashion so as to accommodate the maximum length in the available space and thus introduce a large thermal resistance.

The novel features that are considered characteristic of this invention are set forth in the appended claims. The invention will best be understood from the following description when read in connection with the accompanying drawing.

BRIEF DESCRIPTION OF THE DRAWING

FIG. 1 is a perspective view of a typical hand held portable noncontact temperature measuring instrument;

FIG. 3 is a sectional view depicting the physical configuration of a thermopile detector means in accordance with the present invention;

FIG. 4 is a sectional view depicting first and second thermopile elements mounted in a common housing in accordance with the preferred embodiment of the invention; and FIG. 5 is a sectional view taken substantially taken along the plane 5—5 of FIG. 4 showing a preferred high thermal resistance lead in conductor configuration.

DETAILED DESCRIPTION

Figure 2:
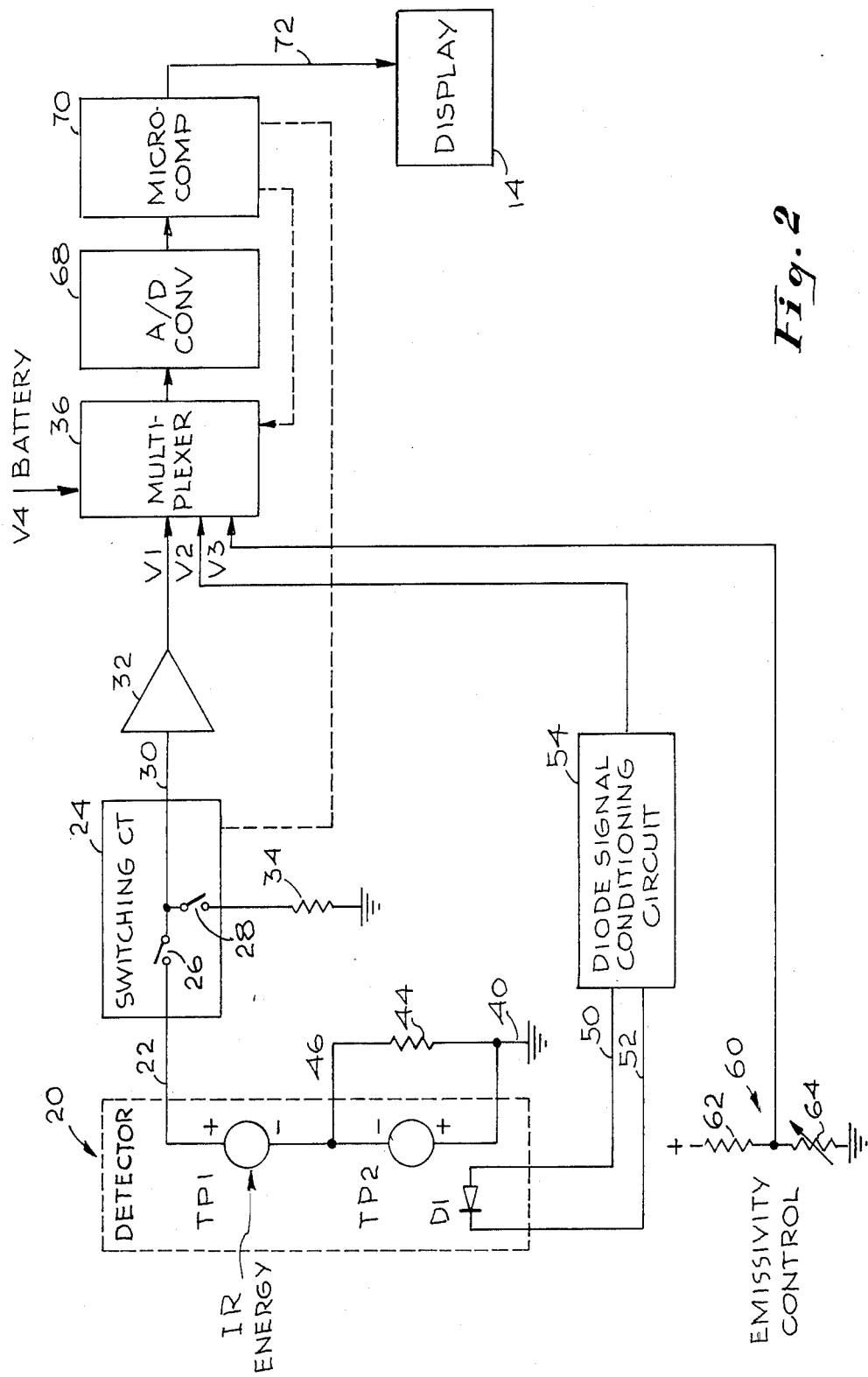
FIG. 2 is a block diagram of a thermopile detector means and related circuitry in accordance with the present invention useful in the instrument of FIG. 1.

Attention is initially directed to FIG. 1 which depicts a typical hand held battery operated noncontact temperature measuring instrument 7. The instrument 7 is intended to be used to measure the temperature of a remote body or target 9 which radiates infrared energy. The instrument 7 is generally comprised of a handle portion 11 and a barrel portion 12. The barrel portion 12 contains detector means which responds to the infrared radiation from target 9 to produce a temperature indicating signal for driving a temperature display 14. An instrument as depicted in FIG. 1, frequently called an infrared thermometer, is disclosed in the aforementioned U.S. Pat. No. 4,456,390. That patent discloses circuit improvements for compensating for temperature induced variations in detector responsivity and additionally for compensating for amplifier drift.

The improvement introduced in the aforementioned patent considerably enhance the instrument's overall performance but nevertheless fail to eliminate errors attributable to rapid and large ambient temperature transients. These errors are particularly noticeable and troublesome when infrared thermometers as depicted in FIG. 1 are used in industrial applications where they may be moved relatively quickly from a storage temperature at 72 degrees F to the vicinity of an industrial furnace, for example, where temperatures can readily exceed 100 degrees F. These large and rapid ambient temperature changes typically pipe small amounts of heat into the detector along various thermal paths and result in overshoots of the temperature reading in the direction of temperature change.

The present invention is directed primarily to an improved infrared detector means useful in an infrared thermometer of the type depicted in FIG. 1 for minimizing temperature reading errors attributable to ambient temperature changes. Although the detector means improvements to be discussed hereinafter are applicable to a broad range of infrared thermometers, including that depicted in detail in the aforementioned U.S. Pat. No. 4,456,390, they will be disclosed herein in association with a microcomputer based signal processing system as depicted in FIG. 2.

FIG. 2 is a block diagram depicting electronic circuitry of an infrared thermometer 7 incorporating a detector means in accordance with the present invention. Basically, the electronic circuitry is comprised of a detector means 20 which supplies an output voltage on terminal 22 indicating the temperature of the target 9. The details of the detector means 20 will be discussed in greater detail hereinafter. Suffice it to understand at this point that output terminal 22 is coupled to a switching circuit 24, schematically depicted as including single pole single throw switch 26 and single pole single switch 28. Switch 26 connects detector means output terminal 22 to the input 30 of amplifier 32. Switch 28 connects the amplifier input 30 to ground through resistor 34. The output of amplifier 32 is represented as voltage V1 and is supplied to multiplexer 36.

The detector means 20, as depicted in FIG. 2, is comprised of a first thermopile device TP1 and a transducer or second thermopile device TP2. As will be discussed in further detail hereinafter, thermopile TP1 is exposed to infrared energy radiating from the target 9 to be measured. On the other hand, thermopile TP2 is shielded from the infrared radiation. However, the thermopile devices TP1 and TP2 are mounted proximate to one another so as to be exposed to the same ambient temperature. As is well known, thermopile devices are voltage generators which produce a DC output voltage related to the infrared energy incident thereon. In accordance with the present invention, the devices TP1 and TP2 are connected in series opposition between ground terminal 40 and the aforementioned output terminal 22.

In the absence of infrared energy incident on thermopile TP1, the devices TP1 and TP2, if perfectly matched, should respond identically to ambient temperature conditions and thus generate the same DC output voltages. Since the devices are connected in series opposition, this should produce a zero output voltage at terminal 22. Although it is theoretically desirable to prefectly match the thermopile devices TP1 and TP2, in actuality, it is impossible to perfectly match these devices. Accordingly, in accordance with the invention, at the time of initially assembling an infrared thermometer, the transfer characteristics of a pair of thermopile devices are measured. The thermopile device which generates a higher output voltage over the desired range of ambient temperatures is then used as the inactive shielded device TP2. The larger output of device TP2 is then trimmed down with an external loading resistor 44 to equal the transient output of the active thermopile device TP1 exposed to the radiation. The determination of the appropriate value for trim resistor 44 is performed at a subassembly fabrication stage by placing the detector means 20, while preferably already mounted in the barrel portion 12, in an oven and monitoring the voltage output of the thermopile devices at terminals 22 and 46 with a voltmeter. Trimming preferably should be performed during the temperature transient cycle when the output voltage from the series connected thermopiles peaks. At this time a resistance is introduced in parallel with thermopile TP2 to zero the output on terminal 22. The magnitude of the trimming resistor determined while the detector means is in the oven is then noted and the closest available standard resistor is subsequently installed at 44 during a subsequent fabrication stage. Typically, the characteristics of the thermopile devices remain constant over their life and thus no further adjustment of resistor 44 should be necessary over the life of the instrument.

FIG. 2 depicts a temperature sensor in the form of diode D1 incorporated in the detector means 20. Whereas the function of thermopile TP2 is to develop a signal to compensate for ambient temperature transients, i.e. rapid temperature changes, the function of diode D1 is to develop a reference signal indicative of the stable, i.e. nontransient, ambient temperature level. The anode and cathode terminals of diode D1 are connected to input terminals 50 and 52 of a diode signal conditioning circuit 54. Circuit 54 is analogous to circuit 26 in the aforementioned U.S. Pat. No. 4,456,390 and provides an output signal V2 which is representative of the temperature measured by diode D1. Voltage V2 is also coupled to the input of multiplexer 36 and is used to compensate for temperature induced variations in the responsivity of detector means 20. A third voltage, V3, is also applied to the input of multiplexer 36 and is derived from an emisivity control circuit 60 comprised of a fixed resistor 62 and a variable resistor 64 connected in series. Resistor 64 is intended to be manually controlled by a user of the infrared thermometer to adjust the instrument for different emisivities of the target. More specifically, the emissivity control effectively comprises a gain control and is provided to enable the user to adjust the instrument depending upon the perceived emisivity of the target. For example, targets comprising perfect black bodies have an emisivity of 1.0, by definition, indicating that for a given temperature, they radiate as much infrared energy as possible. On the other hand, a grey body may typically have an emissivity of 0.8 meaning that a grey body yields only about 80% of the radiation of a black body at a given temperature. Proper use of the infrared thermometer requires that the user compensate for the difference in emisivity of a body. Accordingly, when the user notes that the target comprises a grey body, he will crank the control knob on resistor 64 to effectively increase the magnitude of voltage V3 by 1.0/0.8.

In addition to the aforementioned voltages V1, V2, and V3, a voltage V4 indicative of battery level is also applied to multiplexer 36. The output of multiplexer 36 is applied to an analog to digital converter 68. Thus, the particular voltage supplied by multiplexer 36 to the converter 68 will result in the converter providing a multibit digital signal output to microcomputer 70. The microcomputer 70 adjusts the temperature to produce an output signal on line 72 for driving the aforementioned display 14. Additionally, the microcomputer 70 is schematically depicted as controlling various elements of the circuitry depicted in FIG. 2. For example, the microcomputer 70 controls the multiplexer 36 so that the voltage V1, V2, V3 and V4 applied thereto are sampled in a desired sequence. The microcomputer also controls the switching circuit 24 to alternatively define first and second states. During the first or operational state, switch 28 is open and switch 26 is closed so that the output of detector means 20 is applied from terminal 22 to the input 30 of amplifier 32. Periodically, the microcomputer 70 opens switch 26 and closes switch 28 to perform a zeroing operation. The performance of automatic zeroing is described in the aforementioned U.S. Pat. No. 4,456,390 which depicts an auto zero circuit 34 which assures substantially driftless operation of the temperature indicating amplier by periodically reducing the amplifier output signal to zero under no input signal conditions. During this time, the bias currents associated with the amplifier (e.g. amplifier 32 in FIG. 2) are adjusted to zero the output of amplifier 32.

From the foregoing description of FIG. 2, the overall operation of an infrared thermometer in accordance with the present should be understood. It is again pointed out that the improvements in accordance with the present invention relate to the detector means 20 which provide a temperature indicating output signal on terminal 22. The electronic circuitry shown in FIG. 2 responsive to the output signal on terminal 22 have been shown only schematically because various known arrangements are suitable for responding to the temperature indicating signal supplied by detector means 20.

FIG. 3 is a sectional view illustrating a first implementation 84 of the detector means 20 utilizing two separately housed thermopiles supported in the barrel portion 12 of the infrared thermometer 7. Basically, the barrel portion 12 comprises a cylindrical housing 80 having an open front entrance support web 82. The cylindrical housing 80 is closed at the rear by a mirror element 86 which focuses the radiant energy incident thereon into horn 88 leading to thermopile device 90. The thermopile device 90 in FIG. 3 thus corresponds to the aforementioned thermopile device TP1 depicted schematically in FIG. 2. A second thermopile device 92, corresponding to the aforementioned device TP2, is depicted as extending from the support web 82 of the cylindrical housing 80. The casing of thermopile device 90 is depicted as having a window 94 for permitting the radiation to pass therethrough to the thermopile sensing area 96. In contrast, the casing 98 of thermopile device 92 is closed to prevent any infrared energy from falling onto the sensing area of the thermopile 92. The embodiment of FIG. 3 assumes that the thermopile device 90 and 92 are identically constructed except that the casing of thermopile 90 has a window therein for passing infrared energy therethrough.

Although FIG. 3 assumes that radiation first passes through open web 82 and is then reflected by mirror element 86 to thermopile sensing area 96, it is pointed out that the unit can be alternatively constructed by making element 86 a lens and web 82 a closed wall. With such an alternative configuration, radiation would enter the housing 80 through lens element 86 and be focused onto thermopile sensing area 96.

Although the detector means 20 of FIG. 2 can be implemented as shown in FIG. 3 utilizing two structurally separate thermopile devices, it is preferable to more intimately arrange the thermopiles to better assure their exposure to a common ambient temperature. Accordingly, attention is now directed to FIG. 4 which depicts a preferred structural arrangement of the detector means 20 in which the two thermopile devices TP1 and TP2 are mounted with a common housing or casing 100, preferably comprising a standard hermetically sealed TO-5 package.

The housing 100 comprises an essentially closed wall 104 enveloping a cavity 106 and is preferably comprised of a cap member 108 and a bottom wall member 110. A window opening 112 is formed in the cap member 108 to permit radiation from the target to pass into the cavity 106. A piece of optical filter material 114 is mounted immediately adjacent the window opening 112. The filter material 114 is preferably selected to define an infrared pass band of interest; e.g. 8–14 micrometers or 2.0–2.4 micrometers.

In accordance with the present invention, two thermopile devices are supported within the cavity 106, being respectively formed on first and second insulative sheets 118, 120, preferably formed of mylar. The mylar sheet 118 is stretched across and supported on a thermally conductive substrate 122, preferably of berylia. Similarly the mylar sheet 120 is attached to a berylia substrate 124. The substrates 122 and 124 are toroidally shaped, having respective central apertures 126 and 128.

The substrates 122 and 124 are stacked against opposite surfaces of an infrared radiation barrier 130. The barrier 130 preferably comprises a sheet of mylar having a gold plated surface adjacent to the substrate 122, i.e. toward the window opening 112.

The stacked thermopile mylar layers 118,120, thermally conductive berylia substrate 122,124, and mylar barrier layer 130 are supported on electrically conductive posts 140, 142 which extend into the cavity 106 through openings 141, 143, in the bottom wall member 110. The conductive posts 140, 142 not only support the aforementioned stack but also provide electrical connection to the thermopile devices formed on the surfaces of mylar layers 118, 120. This will be described further in connection with FIG. 5.

With further reference to FIG. 4, it is pointed that a plate 150 is supported parallel to and spaced from the mylar layer 118 by spacer elements 152. Plate 150 includes a central aperture 154 which functions to define the boundary of the radiation field passing through to the sensing area of the thermopile formed on sheet 118. FIG. 4 does not depict the details of the thermopiles devices formed on mylar sheets 118, 120. Rather, FIG. 4 merely shows a deposit of smoke black 160 on mylar layer 118 positioned in alignment with and immediately beneath the field defining aperture 154 of plate 150. The smoke black 160 is deposited over the hot junction of the thermopile formed on the upper surface of mylar sheet 118, as will be discussed in greater detail in connection with FIG. 5. Smoke black 162 on the bottom surface of mylar sheet 120 covers the sensing area or hot junction of the thermopile formed thereon.

Other aspects of FIG. 4 to be noted are the utilization of a third conductive post 166 which is electrically connected to the conductive wall 104 of the housing 102. Potting material 168 is deposited around posts 140, 142 and 166. The potting material 168 insulates the posts 140 and 142 from the conductive wall 104 of the housing 102 as the posts pass through openings 141 and 143 in the bottom wall member 110. Additionally, the potting material 168 contributes to the hermetic sealing of the housing 100 to retain an inert gas therein, typically xenon, argon, or nitrogen. FIG. 4 further depicts a diode 174 mounted on the lower surface of the mylar sheet 120. The diode 174 corresponds to the diode D1 previously discussed in connection with FIG. 2. The thermopile element formed on mylar sheet 118 corresponds to thermopile device TP1 depicted in FIG. 2 and the thermopile element formed on mylar sheet 120 corresponds to the aforediscussed thermopile device TP2.

Attention is now directed to FIG. 5 which comprises a sectional view taken substantially along the plane 5—5 of FIG. 4 depicting the thermopile element formed on the surface of mylar sheet 118 beneath the smoke black deposition 160. The configuration of the thermopile formed on the mylar sheet 120 is identical to that depicted in FIG. 5.

Deposited thermopile detectors are well known in the art and are discussed, for example, in the aforementioned U.S. Pat. No. 4,456,390. That patent references a conventional thermopile detector, such as the Model 1M manufactured by Dexter Research Center of Dexter, Mich. Such thermopile detectors include a sensing area or hot junction 180 (FIG. 5) and a plurality of cold junctions 182. Each cold junction can be considered as forming a voltage generating cell with respect to the hot junction 180. The multiple voltage generating cells are connected in series to thus produce an output voltage across points 184 and 186 which comprises the sum of the voltages generated between the hot junction 180 and each of the cold junctions 182. To this extent, the thermopile device depicted in FIG. 5 is conventional. An improved feature in accordance with the invention involves the manner of interconnecting the points 184 and 186 to the aforementioned conductive posts 140, 142.

As previously alluded to, as the performance of existing infrared thermometers has been improved and users have expressed a desire to use the instruments in increasingly harsh environments, errors attributable to ambient temperature changes have become a limiting factor on instrument performance. The improvements disclosed in this application are intended to minimize the errors, e.g. temperature overshoots, attributable to ambient temperature changes. It has been recognized in accordance with the invention that these errors are, in part, attributable to heat which flows from the outside world via thermal paths, e.g. conductive posts 140, 142 to the hot junction 180. In conventional thermopile detectors, e.g. see FIG. 3 of aforementioned U.S. Pat. No. 4,456,390, a relatively wide low electrical and thermal resistance path is used to interconnect the posts to the voltage generating points 184 and 186. In accordance with the present invention, in order to minimize the transfer of thermal transients from the outside world along the posts 140, 142 to the hot junction, a relatively narrow and thin conductive pattern 190 is deposited on the mylar sheet 118 to define the lead-in connections between the posts 140, 142 and the voltage output points 184, 186. Most significantly, the conductive path 190 is formed in an essentially serpentine fashion to accommodate a very long length of lead-in connector, within the available space on mylar sheet 118. The utilization of a thin, very long lead-in conductor pattern yields a high thermal resistance path between the posts 140, 142 and the thermopile voltage thermal output points 184, 186 respectively. As a consequence, heating of the hot junction 180 by heat piped along the posts 140, 142 is minimized.

From the foregoing, it should now be apparent that an improved detector means particularly useful in a portable infrared thermometer has been disclosed herein for minimizing temperature reading errors attributable to ambient temperature changes. Significantly, the improved detector means utilizes first and second thermopile devices which are respectively exposed to and shielded from the target being measured. The two thermopile devices are mounted proximate to one another so as to experience the same ambient temperature changes and they are electrically connected in series opposition so as to hull the effect of ambient temperature changes. In accordance with a preferred aspect, the shielded thermopile device is selected to have a higher voltage output than the exposed thermopile device and a trim resistor is utilized to assist in identically matching the effective transfer characteristics of the two thermopile devices. In accordance with further aspects of the preferred embodiment, the two thermopile devices are closely mounted with the same housing to achieve optimum proximity. They are separated by a radiation barrier so as to more efficiently direct radiation from the target onto the active thermopile device TP1 and better shield the inactive thermopile device TP2. Additionally, each of the thermopile devices is preferably constructed in a manner to have high thermal resistance lead-in conductor paths connecting the detector external posts to the voltage output points of the thermopiles. The introduction of high thermal resistance lead-in paths, as by utilizing the serpentine pattern, minimizes the introduction of heat from the environment to the hot junction.

Although a preferred embodiment of the invention has been disclosed herein, it is recognized that various equivalent modifications may now become obvious to those skilled in the art and it is accordingly intended that the appended claims be interpreted to include such modifications.

We claim:

1. Detector means useful in a measuring instrument for responding to infrared radiation from a target to produce a temperature indicating output signal, said detector means comprising:
   first thermopile means for producing an output voltage having a first component related to the amount of infrared radiation incident on a sensing area thereof and a second component related to ambient temperature transients;
   transducer means for producing an output voltage exhibiting substantially the same relationship to ambient temperature transients as said first thermopile means;
   means mounting said first thermopile means and said transducer means in close physical proximity to one another whereby they will experience substantially the same ambient temperature;
   means for exposing said first thermopile means sensing area to radiation from said target;
   means for summing in opposition said output voltages produced by said first thermopile means and said transducer means to produce said temperature indicating signal;
   said transducer means comprising a second thermopile means for producing an output voltage having a first component related to the amount of infrared radiation incident on a sensing area thereof and a second component related to ambient temperature transients; and
   means for shielding said second thermopile means sensing area from radiation from said target.

2. A detector useful in an infrared thermometer comprising:
   a housing having a wall enveloping a cavity and defining a window for passing infrared radiation into said cavity;
   first thermopile means having a sensing area and first and second terminal points for producing an output voltage between said terminal points having a first component related to the amount of radiation incident on said sensing area and a second component related to ambient temperature transients;
   second thermopile means having a sensing area and first and second terminal points for producing an output voltage between said terminal points having a first component related to the amount of radiation incident on said sensing area and a second component related to ambient temperature transients in the same manner as said first thermopile means second component is related to ambient temperature transients;
   means supporting said first thermopile means in said housing oriented so that radiation passing through said housing wall window is incident on said first thermopile means sensing area; and
   means supporting said second thermopile means in said housing oriented so that said sensing area thereof is shielded from said radiation passing through said housing wall window.

3. Detector means useful in a measuring instrument for responding to infrared radiation from a target to produce a temperature indicating output signal, said detector means comprising:
   first thermopile means for producing an output voltage having a first component related to the amount of infrared radiation incident on a sensing area thereof and a second component related to ambient temperature transients;
   second thermopile means for producing an output voltage having a component exhibiting substantially the same relationship to ambient temperature transients as said first thermpile means second component;
   means mounting said first and second thermopile means in close physical proximity to one another whereby they will experience substantially the same ambient temperature;
   means for exposing said first thermopile means sensing area to radiation form said target;
   means for shielding said second thermopile means sensing area from radiation from said target; and
   means for summing in opposition said output voltages produced by said first and second thermopile means to produce said temperature indicating signal.

4. The detector means of claim 3 further including:
   signal conditioning means for hulling said temperature indicating signal in the absence of radiation from said target incident on said first thermopile means sensing area.

5. The detector means of claim 3 wherein said second thermopile means is selected to produce a larger output voltage than said first thermopile means over a wide ambient temperature range; and
   resistance means connected in parallel with said second thermopile means for nulling said temperature indicating signal in the absence of radiation incident on said first thermopile means sensing area.

6. A detector useful in an infrared thermometer comprising:
   a housing having a wall enveloping a cavity and defining a window for passing infrared radiation into said cavity;
   a first sheet of insulating material;
   first thermopile means carried by said first sheet having a sensing area and first and second terminal points for producing an output voltage between said terminal points having a first component related to the amount of radiation incident on said sensing area and a second component related to ambient temperature transients;
   a second sheet of insulating material;
   second thermopile means carried by said second sheet having a sensing area and first and second terminal points for producing an output voltage between said terminal points having a first component related to the amount of radiation incident on said sensing area and a second component related to ambient temperature transients in the same manner as said first thermopile means second component is related to ambient temperature transients;
   means supporting said first sheet in said housing for orienting said first thermopile means so that radiation passing through said housing wall window is incident on said first thermopile means sensing area; and means supporting said second sheet in said housing for shielding said second thermopile means sensing area from said radiation passing through said housing wall window.

7. The detector of claim 6 wherein said first sheet of insulating material is mounted on a first thermally conductive substrate having a substantially central aperture; and wherein said first thermopile means sensing area is located adjacent to said first substrate central aperture.

8. The detector of claim 6 wherein said second sheet of insulating material is mounted on a second conductive substrate having a substantially central aperture; and wherein said second thermopile means sensing area is located adjacent to said second substrate central aperture.

9. The detector of claim 8 wherein said first and second substrates are mounted parallel to one another; and further including radiation shield means mounted between said first and second substrates.

10. The detector of claim 9 wherein said radiation shield means comprises a sheet of dielectric material having a metallization layer on the surface thereof proximate to said first substrate.

11. The detector of claim 6 including first and second conductive lead-in means carried by said first sheet respectively electrically connecting said first thermopile first and second terminal points to said first and second posts, each of said lead-in means comprising a thin narrow layer of conductive material formed on said sheet to define a long serpentine path characterized by a high thermal resistance for minimizing heat flow via said posts to said first thermopile sensing area.

12. An instrument for measuring and displaying the temperature of a remote target, said instrument comprising:

an instrument housing;
a detector means mounted in said housing, said detector means comprising:
first thermopile means for producing an output voltage related both to the amount of infrared radiation incident on a sensing area thereof and to ambient temperature transients;
second thermopile means for producing an output voltage related both to the amount of infrared radiation incident on a sensing area thereof and to ambient temperature transients in the same manner as said first thermopile means;
means mounting said first and second thermopile means in close physical proximity to one another whereby they will experience substantially the same ambient temperature;
means for exposing said first thermopile means sensing area to radiation from said target;
means for shielding said second thermopile means sensing area from radiation from said target;
means for summing in opposition said output voltages produced by said first and second thermopile means to produce a temperature indicating signal; and
means responsive to said temperature indicating signal for displaying the temperature of said target.

13. The instrument of claim 12 wherein said detector means includes a housing having a wall enveloping a cavity; and wherein said first and second thermopile means are both mounted in said housing cavity.

14. The instrument of claim 12 wherein said instrument housing includes a handle portion and a barrel portion extending substantially perpendicularly therefrom; and wherein said detector means is mounted in said barrel portion.

* * * * *